(12) United States Patent
Ayyagari et al.

(10) Patent No.: US 10,395,235 B2
(45) Date of Patent: Aug. 27, 2019

(54) SMART MOBILE APPLICATION FOR E-COMMERCE APPLICATIONS

(71) Applicant: International Business Machines Corporation, Armonk, NY (US)

(72) Inventors: Phani Kumar V U Ayyagari, Hyderabad (IN); Manish A. Bhide, Hyderabad (IN); Purnachandra R. Jasti, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 359 days.

(21) Appl. No.: 15/235,452

(22) Filed: Aug. 12, 2016

(65) Prior Publication Data

US 2018/0047009 A1 Feb. 15, 2018

(51) Int. Cl.
| H04W 8/30 | (2009.01) |
| G06Q 20/02 | (2012.01) |
| G06Q 20/32 | (2012.01) |
| G06Q 20/40 | (2012.01) |

(52) U.S. Cl.
CPC ....... *G06Q 20/3226* (2013.01); *G06Q 20/027* (2013.01); *G06Q 20/322* (2013.01); *G06Q 20/325* (2013.01); *G06Q 20/40* (2013.01); *G06Q 20/405* (2013.01); *H04W 8/30* (2013.01)

(58) Field of Classification Search
CPC ...... G06Q 20/40; G06Q 20/10; G06Q 20/322; G06Q 20/405
See application file for complete search history.

(56) References Cited

U.S. PATENT DOCUMENTS

| 2005/0278206 A1 | 12/2005 | Choper |
| 2008/0147516 A1 | 6/2008 | Rousso |
| 2015/0095206 A1* | 4/2015 | Van Heerden ......... G06Q 40/00 705/35 |
| 2015/0379624 A1* | 12/2015 | Poornachandran .... G06Q 30/08 705/80 |
| 2016/0125414 A1 | 5/2016 | Desai et al. |
| 2016/0132853 A1 | 5/2016 | Kumar et al. |

FOREIGN PATENT DOCUMENTS

AU      2015100299 A4 *  4/2015  ........... G06Q 20/227

OTHER PUBLICATIONS

Yuan et al., "Identifying the Ideal Fit between Mobile Work and Mobile Work Support," Information & Management, 47 (2010) 125-137.*
"Appendix P: List of IBM Patents or Patent Applications Treated as Related", dated Jan. 24, 2017, pp. 1-2.
U.S. Appl. No. 15/413,595, filed Jan. 24, 2017; Entitled "Smart Mobile Application for E-Commerce Applications".

* cited by examiner

*Primary Examiner* — Virpi H Kanervo
(74) *Attorney, Agent, or Firm* — Daniel R. Simek; Marcus Walker

(57) ABSTRACT

An approach using one or more computer processors to send a request from a user for a mobile payment to a payment gateway and to determine that an event has occurred on a mobile computing device of a user. The approach includes sending a request for additional transaction time for the mobile payment.

15 Claims, 4 Drawing Sheets

SMART MOBILE APPLICATION FOR E-COMMERCE APPLICATIONS

BACKGROUND OF THE INVENTION

The present invention relates generally to the field of e-commerce and more particularly to smart mobile applications for e-commerce applications and transactions.

Mobile applications or mobile apps are evolving daily. Mobile apps exist for all types of e-commerce applications including payments, ticket booking, on-line shopping, mobile banking, and so on. Most of these mobile apps are internet based and require an internet connection to function. Disruptions of an internet connection between a mobile device and a financial institution may occur due to a number of reasons. For example, a wireless signal to the mobile computer or smart phone may fluctuate or be lost; a mobile computer battery power may be depleted or consumed causing a temporary loss of the ability of the mobile computer to connect with the internet.

Most mobile apps for e-commerce utilize a payment gateway or service that integrates information such as amount of purchase from a shopping cart or other merchant or retailer order summary program with user provided payment information (e.g., credit card information, personal identification number (PIN), passwords, etc. for user validation). The payment gateway encrypts data and transmits the provided data to the associated financial institution (e.g., the issuing bank for the credit card) for authorization of the transaction. The payment gateway provides the authorization response to the merchant and in some cases, the purchasing user (e.g., cardholder).

Many e-commerce transactions or payment methods use one-time passwords with a short activation period or a maximum time allowed for completion of mobile payment authorizations. Most e-commerce transactions require the user to input all required identifications, passwords, answer pre-determined security questions, or other security checks in a timely manner to ensure the secure completion of the transaction. If a user does not complete an entry or input of required information or passwords for an e-commerce transaction in the time allotted by the financial institutions or banks, then the transaction times out and terminates.

SUMMARY

Embodiments of the present invention disclose a method, a computer program product, and a system for one or more computer processors to send a request from a user for a mobile payment to a payment gateway and to determine that an event has occurred on a mobile computing device of a user. Furthermore, the method includes the one or computer processors sending a request for additional transaction time for the mobile payment.

DETAILED DESCRIPTION

Figure 1:
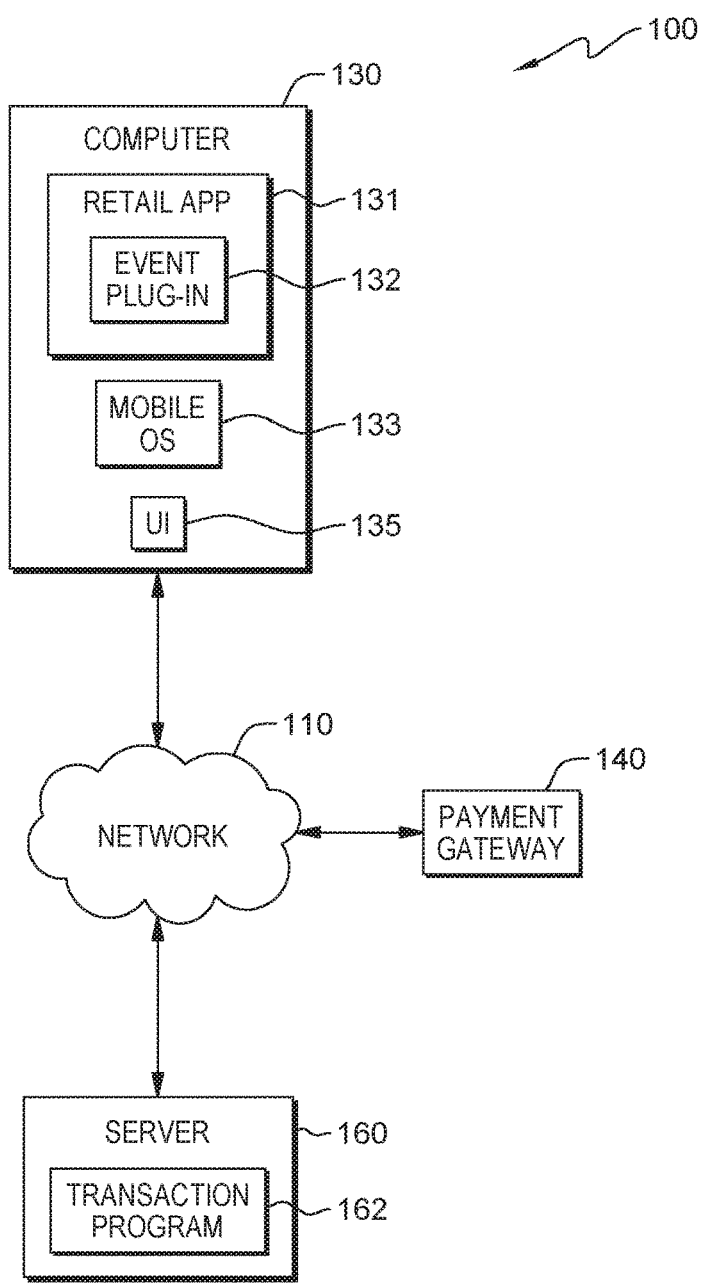
FIG. 1 is a functional block diagram illustrating a distributed data processing environment, in accordance with an embodiment of the present invention.

Embodiments of the present invention recognize that during processing of an authorization in an e-commerce payment system utilizing a mobile app, the mobile app may receive an incoming call or other event interrupting a user input such as inputting a password, security code, or other secure user validation input required for an e-commerce transaction. Events such as an incoming call, a low battery, or a loss of internet connection for a computing device or smart phone may cause the processing of the authorization for the mobile payment to timeout or expire before completion. Embodiments of the present invention recognize that the data input by a user to request processing of an authorization of a mobile payment or a mobile banking request from a mobile app (e.g., a mobile app for on-line shopping or an app for access to a goods or service provider website) generally needs to be completed in a timely manner.

Embodiments of the present invention recognize that when requests for authorization of a mobile payment or of a mobile banking transaction do not occur within a pre-set time determined by a financial institution or institutions authorizing the mobile payment or the mobile banking transaction then, the transaction times out and the requesting user needs to re-initiate the mobile payment or banking transaction request (e.g., re-enter required information such as user identification and passwords). Embodiments of the present invention recognize that re-entry of required information for mobile payment, mobile banking, or other similar financial mobile transaction is time consuming for the user.

Embodiments of the present invention provide a method to reduce incomplete processing of a mobile payment authorization due the occurrence of a timeout when the user does not complete inputting and transmission of required mobile payment information in the required amount of time. Embodiments of the present invention provide a mobile application with the ability to receive a notification when specific events occur that may cause an interruption or disruption to the entry of required data for an authorization request such as security codes, passwords, and the like. Embodiments of the present invention provide a mobile application with the ability to use an event plug-in that receives a notification of the occurrence of specific events that are potential disruptions to the timely entry of required information for a mobile payment authorization. Embodiments of the present invention provide a method to communicate a request for additional time for a user to complete data entry for a mobile payment authorization request to the associated financial institutions or banks based, at least in part, on receiving from a computing device's mobile OS a notification of the occurrence of one or more potentially disruptive events during user input of required information for a mobile payment or mobile banking transaction. Embodiments for the present invention improve a computer's or mobile device's ability to complete a mobile payment by providing a method to identify potential events that extend the time a user needs to input required information to complete a request for a mobile payment and providing a method to receive additional time for required user inputs. Embodiments of the present invention provide a method to reduce a user's need to re-access and re-authorize the mobile payment request due to insufficient time for data entry.

FIG. 1 is a functional block diagram illustrating a distributed data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

As depicted, distributed data processing environment 100 includes computer 130, payment gateway 140, and server 160 all interconnected over network 110. Network 110 can include, for example, a telecommunications network, a local area network (LAN), a virtual LAN (VLAN), a wide area network (WAN), such as the Internet, or a combination of the these, and can include wired or wireless connections. Network 110 can include one or more wired and/or wireless networks that are capable of receiving and transmitting data including optical signals, radio wave signals, voice, and/or video signals, including multimedia signals. In general, network 110 can be any combination of connections and protocols that will support communications between computer 130, payment gateway 140, server 160, and other computing devices (not shown) within distributed data processing environment 100.

Computer 130 may be a smart phone, a tablet, a wearable computer (e.g., a smart watch), a laptop computer, a notebook computer, a desktop computer, or any programmable electronic device capable of communicating with various components and devices within distributed data processing environment 100, via network 110. In various embodiments, computer 130 is a mobile computing device such as a smart phone, a smart watch or a tablet computer. In an embodiment, computer 130 is one or more computing devices (e.g., a user's smart phone and a laptop) that are connected via a shared network connection and working in a coordinated manner (e.g., sharing data). In general, computer 130 represents any programmable electronic device or combination of programmable electronic devices capable of executing machine readable program instructions and communicating with other computing devices (not shown) within distributed data processing environment 100 via a network, such as network 110. Computer 130 may include internal and external hardware components, as depicted and described in further detail with respect to FIG. 4.

As depicted in FIG. 1, computer 130 includes retail app 131 with event plug-in 132, mobile operating system (OS) 133, and a user interface (UI) 135. Computer 130 is depicted as an example of one embodiment of the present invention, but embodiments of the present invention are not limited to the types of programs or specific app (i.e., retail app 131) depicted in FIG. 1.

Retail app 131 is an application or program on computer 130. In various embodiments, retail app 131 is a mobile application or "app" for connecting computer 130 to a retail internet site, a merchant website, a company website, or the like for on-line shopping. Mobile application software, or an "app," is a computer program designed to run on smart phones, tablet computers and other mobile devices. Retail app 131 may provide access to a merchant website or other on-line shopping website, allowing browsing and the selection of products for purchase. While connected via network 110 to a retail or merchant website, retail app 131 with event plug-in 132 enables mobile payments or transactions for e-commerce using a mobile payment process. In various embodiments, retail app 131 is any mobile application or app configured with event plug-in 132 used for mobile payments, e-commerce transactions, mobile or online banking, or other similar app use for executing financial transaction using computer 130. Retail app 131 using event plug-in 132 initiates and provides the ability to execute e-commerce transactions such as mobile payments. In an embodiment, retail app 131 is a mobile banking app, a mobile wallet app, a direct payment app, or the like for mobile banking and/or mobile financial transactions. Retail app 131 may use payment gateway 140 to access server 160 for authorization and the completion of mobile payments or online financial transactions requested by a user on UI 135. Payment gateway 140 may be invoked directly by retail app 131 using event plug-in 132 or retail app 131 using event plug-in 132 may invoke another app on computer 130 (e.g., a smart phone or a laptop computer) which can communicate with payment gateway 140.

Event plug-in 132 is a software extension to retail app 131. In various embodiments, an event plug-in performing the operations and function of event plug-in 132 is included in other mobile applications (e.g., in mobile banking apps, mobile wallet apps, net banking apps, and the like) that provide the ability to perform mobile financial transactions or mobile payments requiring an internet connection and using a time limit for required user input(s)). Event plug-in 132 requests mobile OS 133 to monitor the operations of computer 130 for various events significant to the ability to complete a desired e-commerce transaction such as a mobile payment in a timely manner. In an embodiment, event plug-in 132 is configured to monitor for events. The various events may include an incoming call or an intermittent wireless signal that may disrupt or interrupt a user's ability to input a required password for example, in a request for mobile payment authorization. Upon receiving a notification of an occurrence of one or more of the various events from mobile OS 133, event plug-in 133 requests additional time to complete one or more required user inputs (e.g., security codes) from the associated financial institutions. Event plug-in 132 may request server 160 for additional time to complete a request for payment authorization for a mobile payment for the purchase of goods or services. In various embodiments, upon receiving a notification of additional time for the mobile payment authorization from the financial institution or institutions involved in the authorization process, event plug-in 132 is configured to create an alert or update an existing alert to inform the user of an impending timeout for the mobile payment authorization or user input required for authorization.

Mobile OS 133 is an operating system for a mobile computing device (e.g., computer 130). Mobile OS 133 is any known mobile operating system compatible with computer 130. In various embodiments, mobile OS 133 is configured to identify and notify event plug-in 132 of specific events occurring on computer 130. In various embodiments, mobile OS 133, when monitoring for events, notifies event plug-in 132 of the occurrence of events in near real-time and/or in real-time. The specific events monitored by mobile OS 133 upon receiving a request from event plug-in 132 are events that may cause a potential disruption of internet connection for computer 130 or may be a potential user distraction or disruption to user attention delaying a required user input or inputs in retail app 131 (e.g., a security code or password for mobile payment completion). In an embodiment, mobile OS 133 is configured to notify each computing device accessed or registered to a user. Events configured in mobile OS 133 for monitoring include but are not limited to events occurring on computer 130 such as an intermittent wireless signal received by computer 130, a low battery, or other situation in computer 130 indicating a potential internet connection disruption. Events included for monitoring on computer 130 by mobile OS 133 may also include an incoming call, a message, an urgent e-mail, or other potential disruption or user distraction preventing or delaying a required user input (e.g., a password) required for mobile payment authorization. Monitoring of events by mobile OS 133 terminates when retail app 131 with event plug-in 132 is closed.

User interface 135 provides an interface for computer 130 with payment gateway 140, server 160, and other computing devices in distributed data processing environment 100 (not shown). In various embodiments, user interface 135 is mobile application software that provides an interface between the users of computer 130, payment gateway 140 and server 160. In one embodiment, user interface 135 is a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. User interface 135 enables computer 130 to receive a user input such as a password, security code, or the like to initiate and process a mobile payment request to server 160.

Payment gateway 140 is a known e-commerce application that provides authorization for e-commerce payments, transactions, or mobile app purchases. Payment gateway 140 may be used with mobile payments performed with retail app 131 using event plug-in 132. Upon completion of a user's selection of products or services for purchase, for example using a shopping cart in retail app 131, a user inputs payment information and required user validation information in retail app 131 using event plug-in 132. Required payment information for requesting a mobile payment authorization may include payment method, required payment passwords, PIN, security codes, security questions, and the like which are collected along with purchase information such as the purchase amount provided at customer checkout (e.g., from the shopping cart or the like). The purchase amount and payment information (e.g., accounts, passwords, etc.) are collected and managed (e.g., encrypted for security) by payment gateway 140 using known methods. Payment gateway 140 provides the collected and encrypted information for payment authorization to the associated financial institution or institutions (e.g., directly to the purchasing user's bank, to multiple financial institutions such as through an acquiring and issuing bank, or other group of financial institutions) using known methods.

Server 160 can be a standalone computing device, an application server, a web server, a management server, a database server, or any other electronic device or computing system capable of receiving, sending, and processing data with computer 130, payment gateway 140, and other computing devices (not shown) within distributed data processing environment 100 via network 110. In another embodiment, server 160 can be a laptop computer, a tablet computer, a netbook computer, a personal computer (PC), a desktop computer, a personal digital assistant (PDA), a smart phone, or any programmable electronic device capable of communicating with computer 130, and payment gateway 140. In various embodiments, server 160 represents a computing system utilizing clustered computers and components (e.g., database server computers, application server computers, etc.) that act as a single pool of seamless resources such as used in a cloud-computing environment when accessed within distributed data processing environment 100.

Server 160 includes transaction program 162. In various embodiments, server 160 is a server used in a financial institution or a financial services system such as a bank or a credit card corporation. Server 160 sends and receives data from computer 130 and payment gateway 140 such as requests for additional transaction time generated by event plug-in 132 on computer 130 and requests for mobile payment authorization in support of a product or service purchase generated by a user. Server 160 may include internal and external hardware components, as depicted and described in further detail with respect to FIG. 4.

Transaction program 162 is utilized to receive transaction requests, authorize transactions such as mobile payments for e-commerce applications, complete the monetary or currency exchanges required to complete a transaction using known methods, and to approve requests for additional transaction time from event plug-in 132. If transaction program 162 in server 160 approves a request for additional time for the user to input required information from event plug-in 132, then the program using server 160 may send a notification of the additional time to event plug-in 132 on computer 130.

Figure 2:
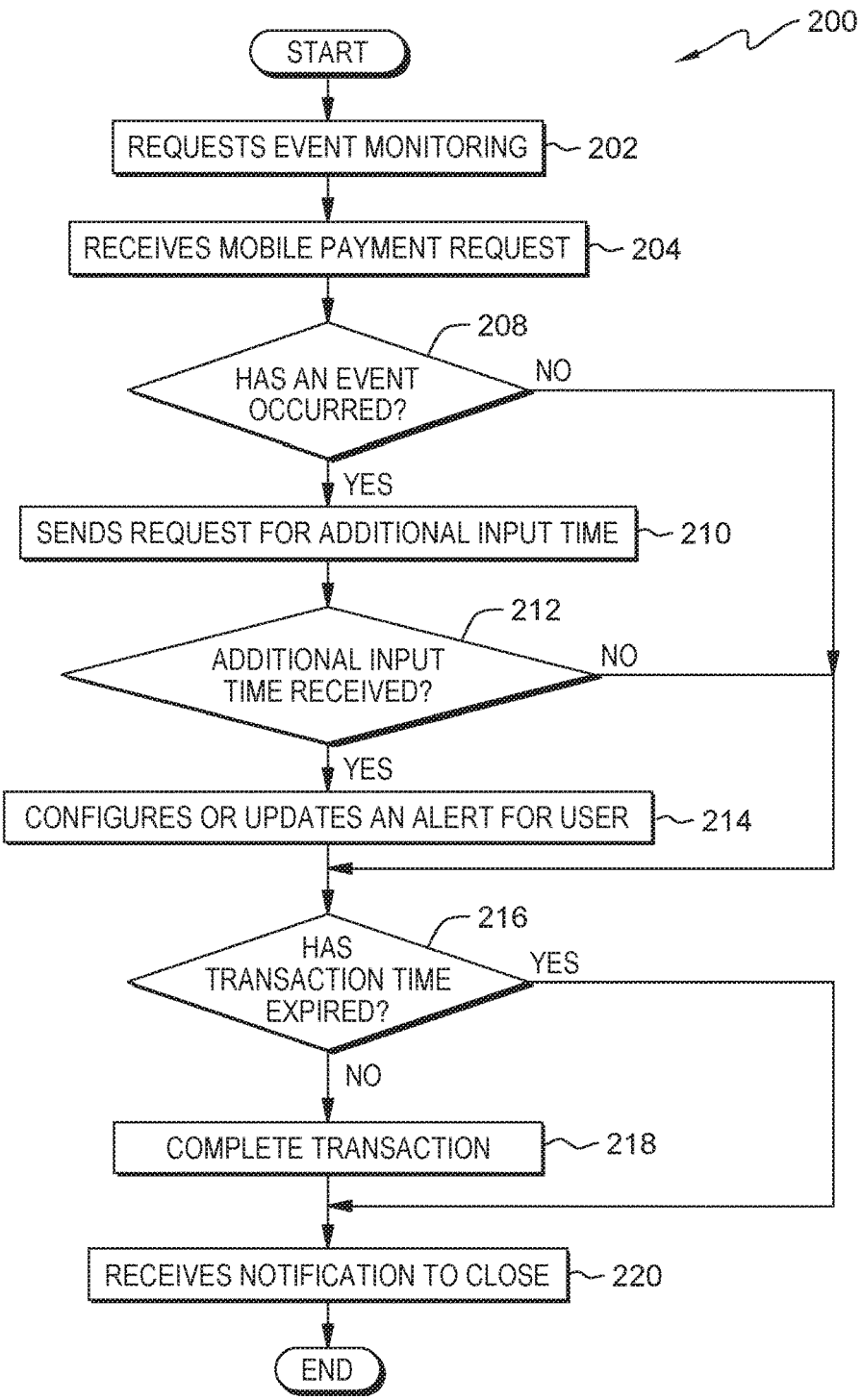
FIG. 2 is a flowchart depicting operational steps of one example of a method to request an authorization for an e-commerce transaction or mobile payment using an event plug-in, in accordance with an embodiment of the present invention.

FIG. 2 is a flowchart 200 depicting operational steps of one example of a method to request an authorization for an e-commerce transaction or mobile payment using an event plug-in 132, in accordance with an embodiment of the present invention.

In step 202, event plug-in 132 requests event monitoring. When a user initiates event plug-in 132 by opening retail app 131, then event plug-in 132 sends a request to mobile OS 133 to begin monitoring specific events. In an embodiment, event plug-in 132 is configured to monitor computer 130 for events (e.g., incoming calls or alerts/urgent messages).

The specific events monitored by mobile OS 133 for event plug-in 132 include any event that may cause a change or interruption in data transmission or receipt of new data (e.g., an incoming call or an urgent message), any event indicating a detected, potential change in internet connection, or other potential disruption to user input activities on computer 130, for example, required user data entry for authorization of a mobile payment in retail app 131 using event plug-in 132. In particular, event plug-in 132 requests monitoring of the specific events that relate to a potential temporary disruption of a user's ability to provide required inputs such as passwords including one-time use passwords with limited validity time, personal identification numbers (PIN), security codes, answering security questions, or other known user validation methods in a timely manner. The input of information such as passwords or security codes may have a time limit for completion (e.g., have an associated timeout period that is applied by server 160). Financial institutions or banks typically have a threshold or an allowable period of time that limits the amount of time allotted for a user to input required information such as passwords, security codes, and the like for submission to server 160. When the allowable period of time occurs or is passing, server 160 will timeout or terminate the transaction.

For example, the specific events requested for monitoring by mobile OS 133 in a mobile payment or by event plug-in 132 are events that may affect a user's ability to input information required for requesting an authorization for e-commerce transactions such as mobile payments for online purchases in a timely manner (e.g., before a timeout).

In various embodiments, event plug-in 132 sends notification of event occurrences to multiple computing devices accessed by a user. Event plug-in 132 includes addresses or locations input by the user for the various computing devices commonly accessed by the user. The specific events requested for monitoring by mobile OS 133 include events that may create a temporary disruption to either the internet connection of computer 130 or a disruption of a user's attention when inputting required information such as a password, a security code, or the like.

Specific events monitored that indicate a potential disruption to the interconnection of computer 130 include but, are not limited to an intermittent or low wireless signal detected by mobile OS 133 or a low battery power indication for computer 130. In an embodiment, an event notification received by event plug-in 132 is generated by mobile OS 133 in response to a glitch in computer 130's connection to retail app 131 or a non-user initiated disrupting of an internet connection for retail app 131 using event plug-in 132 identified by mobile OS 133 or by event plug-in 132 in an embodiment. Specific events requested by event plug-in 132 for monitoring by mobile OS 133 include events that may disrupt or interrupt a user's input for a mobile payment authorization include, but are not limited to incoming calls, incoming notifications from other programs, incoming messages or urgent e-mails.

In various embodiments, the specific events for monitoring by mobile OS 133 are included in the request sent from event plug-in 132. In an embodiment, event plug-in 132 requests mobile OS 133 to configure the events for monitoring upon first use of retail app 131 with event plug-in 133. In one embodiment, mobile OS 133 is pre-configured with the specific events to monitor for event plug-in 132.

In step 204, event plug-in 132 receives a mobile payment request. In various embodiments, event plug-in 132 receives an input from a user (e.g., a user input on UI 135 in computer 130 in FIG. 1) initiating a mobile payment authorization request for an online transaction or purchase. In an embodiment, event plug-in 132 receives a user input initiating an online banking request (e.g., a transfer of funds). In an embodiment, retail app 131 receives the authorization request to process an e-commerce transaction (e.g., a mobile payment or online banking request) and notifies event plug-in 132 of the request.

The completion of the authorization request may include a number of user validation steps. For example, a mobile payment authorization request may be initiated upon selecting "payment" or "place order" from a shopping cart in a mobile app such as retail app 131. In this example, the information required to complete a mobile payment request for authorization by one or more financial institutions or banks may include a user identification, a user password entry, a user PIN or security code, or other user provided inputs required by server 160 (e.g., required by a bank or financial services system). Once event plug-in 132 receives the initiation of an authorization request, the user may require some time to input the required information for user validation to request an authorization. Event plug-in 132 may send an initial authorization request using known methods to receive a one-time use password for authorization request completion to payment gateway 140 and server 160.

In decision step 208, event plug-in 132 determines whether an event has occurred. If event plug-in 132 has received a notification that an event has occurred (yes branch, decision step 208) from mobile OS 133, then event plug-in 132 sends a request for additional input time (step 210) to server 160 using payment gateway 140. Upon receiving, for example, an incoming phone call, a notification from another program, an urgent message, a notification of low battery, or a notification of a fluctuating wireless signal or poor wireless connection from computer 130's operating system (e.g., mobile OS 133) or a notice of another similar event occurring on computer 130 that may interrupt a user's required inputs for a mobile payment or financial transaction, event plug-in 132 sends a request to payment gateway 140 for server 160 to approve additional time for the user to complete the required inputs. The additional time can be an increase to the timeout or increase the validity period for a one-time password for the transaction. For example, if mobile OS 133 in computer 130 detects an intermittent wireless signal or a wireless signal of varying signal strength then, mobile OS 133 notifies event plug-in 132 of the event, which may affect a user's ability to provide inputs for a mobile payment in a timely manner. In response to receiving the notification from mobile OS 133, event plug-in 132 sends a request to payment gateway 140 for server 160 (e.g., to a bank or banks) to allow more time for the user to provide necessary inputs. In an embodiment, event plug-in 132 requests from server 160 more time for a user to complete a request for an online banking.

In an embodiment, event plug-in 132 shares information or notifications of occurring events with the multiple computing devices accessed or registered to the user. In an embodiment, a request for monitoring of events generated by event plug-in 132 and sent to mobile OS 133 may include addresses for multiple computing devices such as a smart phone, a tablet, a notebook, desktop computer, or other computing device accessed by the user. For example, a user is performing a transaction, such as a purchase on a store website via a store mobile app, from a laptop or desktop computer and inputting required mobile payment information (e.g., identification and passwords). During the input, the user is interrupted by an incoming call on the user's smart phone. If an instance of the same store mobile app is present on both the smart phone and the laptop, and the devices are connected via a shared connection, then either event plug-in 132 can send a notification to the desktop computer or mobile OS 133 can send a notification to the app on the smart phone and to the desktop computer, providing a notification of the interruption to the user inputting time sensitive information on the laptop required for an e-transaction. In this example, either the app on the smart phone, or an application or program on the desktop configured with an event plug-in can send a request for additional time (i.e., due to the incoming call) to server 160 at the associated financial institution providing mobile payment authorization.

Event plug-in 132 may include the information such as IP addresses or other computer device identification in a request for event notification. In an embodiment, an event plug-in can be included in applications or programs used to access a retail or banking website on any of the computing devices commonly accessed or registered to a user. With this configuration of event plug-in 132, a notification of an incoming call, message or text may be received by each computing device accessed or registered to a user. For example, the user is doing an e-commerce transaction on his or her notebook computer via a retail website app. When mobile OS 133 or event plug-in 132 identifies a fluctuating wireless signal to the smart phone, notifications may be sent to any open apps with an event plug-in and to the notebook computer registered with event plug-in 132, an event plug-in for the app sends a request for additional user input time to server 160.

If granted (e.g., server 160 increases in the timeout period for the transaction), the additional time requested by event plug-in 132 from server 160 from a financial institution provides the user with more time to enter a password when an interruption or a potential interruption is detected, for example, due to an intermittent wireless connection or an incoming call. The additional time to complete a request for mobile payment or a mobile banking transaction may include extending the validation time allowed for a one-time password provided by server 160 in a financial institution. In various embodiments, event plug-in 132 includes in the request for additional time information on the event driving the request. For example, the request for additional time includes a software code, a metadata identification, or a written description of the type of event occurring (e.g., a potential temporary loss of internet connection due to a poor wireless signal to computer 130).

However, if event plug-in 132 has not received a notification of an event (no branch of decision step 208), then event plug-in 132 determines whether the transaction time has expired (decision step 216).

Upon sending the request for additional input time to server 160 in the respective financial institutions via payment gateway 140, in decision step 212, event plug-in 132 determines whether additional input time is received for the transaction in decision step 212. Event plug-in 132 determines if a notification of additional time is received from server 160 via payment gateway 140 to increase the time allowed for required user inputs (e.g., an increase in a timeout period for the transaction). The additional time, if granted by server 160, may allow completion of the required user inputs for a mobile payment request before a timeout occurs in an e-commerce transaction or mobile payment. For example, after receiving a request for additional time due to an intermittent wireless signal from event plug-in 132, server 160 determines that additional time (e.g., one minute) may be added to the timeout period (e.g. one minute is added to the time allowed for a user to input required information for an online purchase). In another example, event plug-in 132 receives from payment gateway 140 a notification of an increase of two minutes to the validity period for a one-time use password from server 160 after requesting additional time due to a received incoming call received on computer 130. The additional time may be either or both an increase in the timeout period or a longer validity time for a one-time password providing the user with more time to input required information to complete a request for an authorization of an e-commerce transaction such as a mobile payment.

When event plug-in 132 determines that a notification of additional input time has been received (yes branch of decision 212) for an authorization request, then event plug-in 132 may configure or update an alert to the user in step 214. In various embodiments, event plug-in 132 upon receiving a notification of additional time for an authorization request input includes creating, re-setting, or updating an alert to warn a user of impending timeout when the request for additional time by event plug-in 132 is granted (e.g., the timeout period is extended) by server 160. For example, the alert configured by event plug-in 132 could be a beep, a sound, a vibration, a message, or other known alert method that is initiated ten or fifteen seconds before a new timeout for a e-commerce transaction.

However, if event plug-in 132 does not receive a notification that additional authorization input time is received (no branch of decision 212), then event plug-in 132 determines whether a transaction time has expired (decision 216). If event plug-in 132 determines that a transaction time has expired or a timeout occurs (yes branch of decision 216), then the mobile payment request ends and in various embodiments, in step 220, event plug-in 132 receives a notification to close.

However, if event plug-in 132 determines that the transaction time has not expired (no branch of decision step 216), then event plug-in 132 completes the transaction in step 218. Using known methods, the transaction is completed and an authorization request is sent to payment gateway 140. In step 220, event plug-in 132 receives notification to close. In various embodiments, a user inputs on UI 135 in computer 130 a command to close retail app 131 and event plug-in 132. In various embodiments, when retail app 131 using event plug-in 132 receives a user input to close the application, mobile OS 133 determines that event plug-in 132 is closed and ceases event monitoring.

Figure 3:
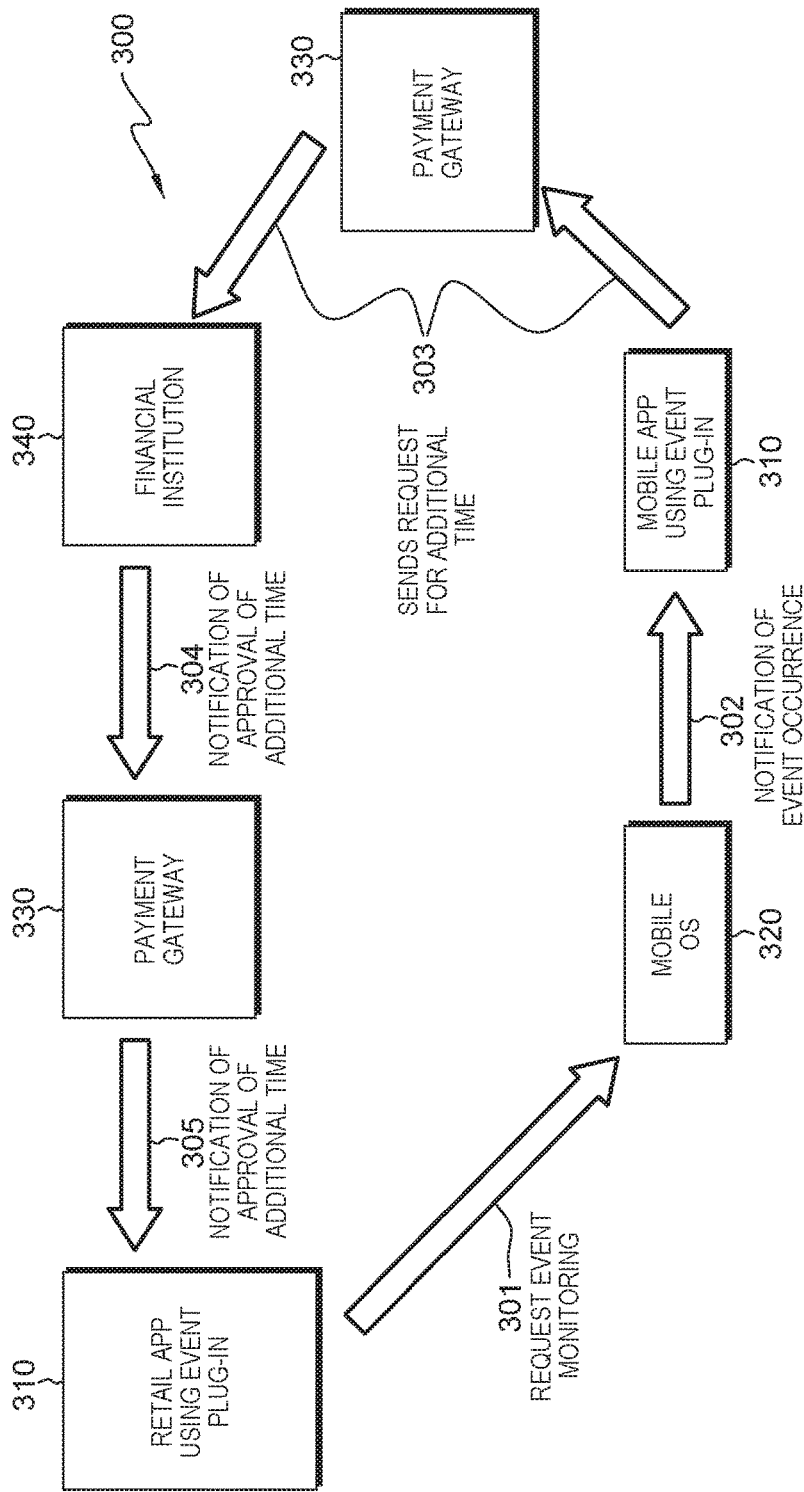
FIG. 3 is an illustration of an example of a process for requesting a mobile payment authorization with an e-commerce mobile app using an event plug-in, in accordance with an embodiment of the present invention.

FIG. 3 is an illustration 300 of an example of a process for requesting a mobile payment authorization with a mobile app using an event plug-in 310, in accordance with an embodiment of the present invention. As depicted, FIG. 3 includes mobile app using event plug-in 310, mobile OS 320, payment gateway 330, and financial institution 340 utilized in the method to request additional time for an e-commerce transaction such as a mobile payment.

Mobile app using an event plug-in 310 provides the functionality of event plug-in 132 discussed previously in FIGS. 1 and 2 with respect to retail app 131 using event plug-in 132. As depicted in FIG. 3, mobile app using event plug-in 310 sends a request for event monitoring 301 to mobile OS 320. Mobile OS 320 provides the same functionality previously discussed in FIGS. 1 and 2 with regard to mobile OS 133. Mobile OS 320 identifies the occurrence of an event and sends a notification of event occurrence 302 to mobile app using event plug-in 310. Mobile app using event plug-in 310 sends a request for additional time 303 for a user to complete inputs (e.g., passwords) when an event occurs to payment gateway 330. Payment gateway 330 provides the same functionality as payment gateway 140 previously discussed. Payment gateway 330, in turn, sends the request for additional time 303 to financial institution 340 that provides the same functionality as server 160 previously discussed in FIGS. 1 and 2.

As depicted in FIG. 3, financial institution 340 approves the request and sends a notification of the approval for additional time 304 to payment gateway 330. Payment gateway 330 sends the notification of approval of the additional time 305 back to mobile app using event plug-in 310.

Figure 4:
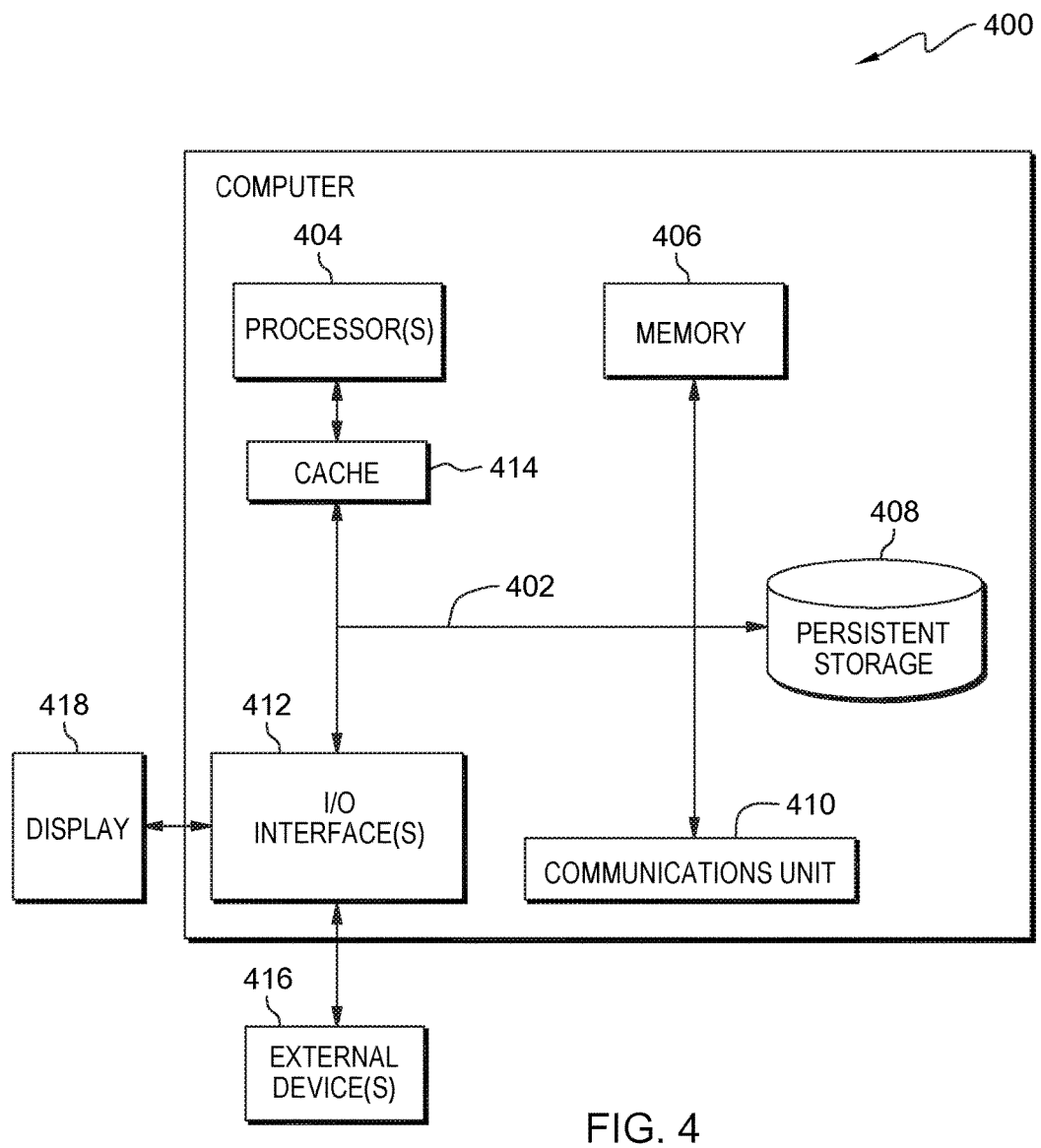
FIG. 4 is a block diagram depicting components of a computer system, in accordance with at least one embodiment of the present invention.

FIG. 4 is block diagram 400 depicting components of a computer system in accordance with at least one embodiment of the present invention. As depicted, FIG. 4 depicts the components of a computer system, which is an example of a system such as computer 130 or a system such as server 160, within distributed data processing environment 100, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Computer 130 and server 160 can include processor(s) 404, cache 414, memory 406, persistent storage 408, communications unit 410, input/output (I/O) interface(s) 412, and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention are stored in persistent storage 408 for execution and/or access by one or more of the respective processor(s) 404 via cache 414. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is part of persistent storage 408.

Communications unit 410, in these examples, provides for communications with other data processing systems or devices, including resources, computer 130, payment gateway 140, server 160, and other computing devices not shown in FIG. 1. In these examples, communications unit 410 includes one or more network interface cards. Communications unit 410 may provide communications with either or both physical and wireless communications links. Program instructions and data used to practice embodiments of the present invention may be downloaded to persistent storage 408 through communications unit 410.

I/O interface(s) 412 allows for input and output of data with other devices that may be connected to computer 130 or server 160. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media, for example, devices such as thumb drives, portable optical or magnetic disks, and memory cards. Software and data used to practice embodiments of the present invention can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor. Display 418 can also function as a touchscreen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application, or technical improvement over technologies found in the marketplace, or to enable others of ordinary skill in the art to understand the embodiments disclosed herein.

What is claimed is:

1. A method comprising:
    requesting, by one or more computer processors, monitoring one or more operating systems of one or more mobile computing devices of a user;
    sending, by the one or more computer processors, a request from the user for a mobile payment to a payment gateway;
    determining automatically, by the one or more computer processors, an event indicating a disruption has occurred on the one or more mobile computing devices of the user based on monitoring the one or more mobile computing devices of the user, wherein the event is a notification causing an interruption to processing of the request for the mobile payment;
    responsive to determining automatically the event indicating the disruption has occurred on the one or more mobile computing devices of the user based on monitoring the one or more operating systems of the one or more mobile computing devices of the user, sending, by the one or more computer processors, a request for additional transaction time to input information for the mobile payment;
    responsive to receiving an approval of the request for the additional transaction time to input information, creating, by the one or more computer processors, an alert to the user to complete the mobile payment within the approved additional transaction time;
    transmitting, by the one of more computer processors, the alert to the user;
    responsive to receiving a response to the transmitted alert that includes information to complete the mobile payment, inputting, by the one or more processors, the information to complete the mobile payment; and
    transmitting, by the one or more processors, the mobile payment.

2. The method of claim 1, wherein the interruption to the processing of the request for the mobile payment includes at least one of a fluctuating wireless signal for an internet connection, a low wireless signal for the internet connection, an incoming phone call, an incoming message, or a low battery power.

3. The method of claim 1, wherein determining automatically the event indicating the disruption has occurred on the one or more mobile computing devices of the user based on monitoring the one or more mobile computing devices of the user further comprises:
    receiving, by the one or more computer processors, a notification that the event has occurred on the one or more mobile computing devices of the user.

4. The method of claim 1, wherein determining automatically the event indicating the disruption has occurred on the one or more mobile computing devices of the user based on monitoring the one or more mobile computing devices of the user further comprises:
sending, by the one or more computer processors, a notification of the event to at least one additional computing device of the user.

5. The method of claim 1, wherein the steps are performed by a plug-in to a mobile app on the mobile computing device of the user.

6. A computer program product embedded in one or more computer readable storage media and program instructions stored on the one or more computer readable storage media, the program instructions executable by a processor, the program instructions comprising instructions for:
requesting monitoring one or more operating systems of one or more mobile computing devices of a user;
sending a request from the user for a mobile payment to a payment gateway;
determining automatically an event indicating a disruption has occurred on the one or more mobile computing devices of the user based on monitoring the one or more mobile computing devices of the user, wherein the event is a notification causing an interruption to processing of the request for the mobile payment;
responsive to determining automatically the event indicating the disruption has occurred on the one or more mobile computing devices of the user based on monitoring the one or more operating systems of the one or more mobile computing devices of the user, sending a request for additional transaction time for the mobile payment;
responsive to receiving an approval of the request for the additional transaction time to input information, creating an alert to the user to complete the mobile payment within the approved additional transaction time;
transmitting the alert to the user;
responsive to receiving a response to the transmitted alert that includes information to complete the mobile payment, inputting the information to complete the mobile payment; and
transmitting the mobile payment.

7. The computer program product of claim 6, wherein the interruption to the processing of t the request for the mobile payment includes at least one of a fluctuating wireless signal for an internet connection, a low wireless signal for the internet connection, an incoming phone call, an incoming message, or a low battery power.

8. The computer program product of claim 6, wherein determining automatically the event indicating the disruption has occurred on the one or more mobile computing devices of the user based on monitoring the one or more mobile computing devices of the user further comprises:
receiving a notification that the event has occurred on the one or more mobile computing devices of the user.

9. The computer program product of claim 6, wherein determining automatically the event indicating the disruption has occurred on the one or more mobile computing devices of the user based on monitoring the one or more mobile computing device of the user further comprises:
sending a notification of the event to at least one additional computing device of the user.

10. The computer program product of claim 6, wherein the steps are performed by a plug-in to a mobile app on the mobile computing device of the user.

11. A computer system comprising:
one or more computer processors;
one or more computer readable storage media; and
program instructions stored on the one or more computer readable storage media for execution by at least one of the one or more processors, the program instructions comprising instructions for:
requesting monitoring one or more operating systems of one or more mobile computing devices of a user;
sending a request from the user for a mobile payment to a payment gateway;
determining automatically an event indicating a disruption has occurred on the one or more mobile computing devices of the user based on monitoring the one or more mobile computing devices of the user, wherein the event is a notification causing an interruption to processing of the request for the mobile payment;
responsive to determining automatically the event indicating the disruption has occurred on the one or more mobile computing devices of the user based on monitoring the one or more operating systems of the one or more mobile computing devices of the user, sending a request for additional transaction time for the mobile payment;
responsive to receiving a approval of the request for the additional transaction time to input information, creating an alert to the user to complete the mobile payment within the approved additional transaction time;
transmitting the alert to the user;
responsive to receiving a response to the transmitted alert that includes information to complete the mobile payment, inputting the information to complete the mobile payment; and
transmitting the mobile payment.

12. The computer system of claim 11, wherein the interruption to the processing of the request for the mobile payment includes at least one of a fluctuating wireless signal for an internet connection, a low wireless signal for the internet connection, an incoming phone call, an incoming message, or a low battery power.

13. The computer system of claim 11, wherein determining automatically the event indicating the disruption has occurred on the one or more mobile computing devices of the user based on monitoring the one or more mobile computing devices of the user further comprises:
receiving a notification that the event has occurred on the one or more mobile computing devices of the user.

14. The computer system of claim 11, wherein determining automatically the event indicating the disruption has occurred on the one or more mobile computing devices of the user based on monitoring the one or more mobile computing devices of the user further comprises sending a notification of the event to at least one additional computing device of the user.

15. The computer system of claim 11, wherein the steps are performed by a plug-in to a mobile app on the mobile computing device of the user.

* * * * *